United States Patent [19]
Mignolet et al.

[11] 4,447,840
[45] May 8, 1984

[54] 2-SPEED MAGNETIC-TAPE CASSETTE APPARATUS

[75] Inventors: Georges M. A. Mignolet; Gilbert E. Mestdagh, both of Eindhoven, Netherlands

[73] Assignee: U.S. Philips Corporation, New York, N.Y.

[21] Appl. No.: 314,947

[22] Filed: Oct. 26, 1981

[30] Foreign Application Priority Data

Apr. 7, 1981 [NL] Netherlands ......................... 8101695

[51] Int. Cl.³ .......................... G11B 5/00; G11B 5/08; G11B 5/54
[52] U.S. Cl. ................................... 360/137; 360/96.5; 360/105
[58] Field of Search .................. 360/137, 90, 93, 96.1, 360/96.2, 96.3, 96.4, 96.5, 132, 105, 73; 242/197

[56] References Cited
U.S. PATENT DOCUMENTS
4,176,383 11/1979 Suzuki ................................. 360/105
4,301,485 11/1981 Takanashi .......................... 360/96.5
4,378,578 3/1983 Shiozu ................................. 360/137

FOREIGN PATENT DOCUMENTS
1121828 7/1962 Fed. Rep. of Germany.
1531594 11/1978 United Kingdom.

*Primary Examiner*—Robert Martin Kilgore
*Attorney, Agent, or Firm*—David R. Treacy

[57] ABSTRACT

In a magnetic-tape cassette apparatus with an electrical power supply (43, 62), a power switch (5, 40, 61) for switching the power supply on and off, a capstan (24) for tape transport, and a speed switching element (20, 54, 67) which can be switched between a first and a second position, for switching the capstan drive to a first and a second speed respectively, switching means (12, 14; 42, 45; 64) are arranged between the power switch and the switching element. The switching means are such that at least during normal operation, each time that the power switch is switched off and is subsequently switched on, the switching element is set to the first position in response to the actuation of the power switch.

11 Claims, 4 Drawing Figures

2-SPEED MAGNETIC-TAPE CASSETTE APPARATUS

BACKGROUND OF THE INVENTION

The invention relates to a magnetic-tape cassette apparatus comprising an electrical power supply, a power switch for switching on and off the power supply, a capstan for the tape drive, and a speed switching element which is switchable between a first and second position, for switching the capstan drive to a first and a second speed respectively.

A magnetic-tape cassette apparatus of this type is known from British Pat. No. 1,531,594. In such a magnetic-tape cassette apparatus the magnetic tape can be driven with two constant speeds for recording and/or playback. The first speed is 4.76 cm/sec., which is the normal speed for such cassette apparatus, while the second speed may be a so-called long-play speed, enabling a longer recording to be made on the magnetic tape than with the first speed. The second speed is preferably half the first speed and is consequently 2.38 cm/sec. In this known apparatus the change-over between a first and a second speed is performed by moving a speed selector selector between two positions so as to adjust a speed switching element. The drawback of such a switchable speed is that each time that the apparatus is put into operation the speed selector may still be set to the second, long-play speed, while in most cases recording or playback with the first, normal speed is desired. This may mislead the user, so that eroneously a recording is made or played back at the second speed.

SUMMARY OF THE INVENTION

It is an object of the invention to ensure that each time that a magnetic-tape cassette apparatus with a normal and a long-play speed is put into operation the tape transport is effected with the normal speed. According to the invention, switching means are arranged between the power switch and the switching element, which means are constructed so that at least during normal operation, each time that the power switch is switched off and subsequently switched on, the switching element is set to the first position by the actuation of the power switch. In this way the first tape speed is dominant relative to the second speed, so that despite the presence of the switching facility the user can be assured that the magnetic tape is driven with the normal speed each time that the apparatus is switched on. Thus, each time that the apparatus is switched on the user has to perform a deliberate operation to set the apparatus to the second speed.

In a preferred embodiment of a cassette apparatus in accordance with the invention the speed selection element is arranged in such way in the apparatus that it can cooperate with the switching means. In this way it is possible that when the speed selection element was initially set to the second, long-play speed, tape transport is effected with the first, normal speed after switching off and subsequent switching on of the apparatus due to this co-operation with the switching means.

It is favorable if the speed selection element can be latched at least in the second position and, when the speed selection element occupies the second position, switching off the power switch causes the speed selection element to be unlatched owing to the presence of the switching means, so that the speed selection element resumes the first position under the influence of spring force. Thus, a speed selection element is obtained whose position always indicates the instantaneous tape speed when the apparatus is put into operation. This adjustment of the speed selection element, in accordance with the invention, may be effected purely mechanically or mechanically/electromagnetically.

In a further embodiment of an apparatus in accordance with the invention the switching means comprise an electronic bistable circuit, which when the power switch is switched on is set to such a state that an output of the circuit supplies the switching voltage required to set the switching element to the first position. Thus, switching to the normal first speed can also be achieved purely electronically, which is of importance if the entire apparatus is controlled electronically, for example by means of a microprocessor.

In this respect a suitable embodiment is characterized in that the bistable circuit is constituted by a flip-flop, whose Q-output and C-input are respectively connected to the speed switching element and the speed selection element, a pulse-shaping circuit being arranged between an input and the electrical power supply, at least during normal operation.

In the aforementioned case it is of advantage if the R or the S-input of the flip-flop is connected to the pulse-shaping circuit by means of a preselection switch. This provides the possibility, in the apparatus in accordance with the invention, to employ a timer for putting the apparatus into operation in a preprogrammed manner at either tape speed.

In a magnetic-tape cassette apparatus of the type known from said British Pat. No. 1,531,594 there is provided a sensor for sensing the wall of the magnetic tape cassette, which sensor, at least if a recess is formed in the wall, cooperates with the speed switching element and sets or maintains said element in the second position. A suitable embodiment of an apparatus in accordance with the invention is characterized in that the sensor is arranged in such a way in the apparatus that when a cassette with a recess is sensed the setting of the speed switching element is not influenced by the switching means upon actuation of the power switch.

Embodiments of the invention will now be described in more detail with reference to the drawing.

BRIEF DESCRIPTION OF THE DRAWINGS

FIG. 1b shows a part of the switching means of FIG. 1a.

DESCRIPTION OF THE PREFERRED EMBODIMENTS

Figure 1A:
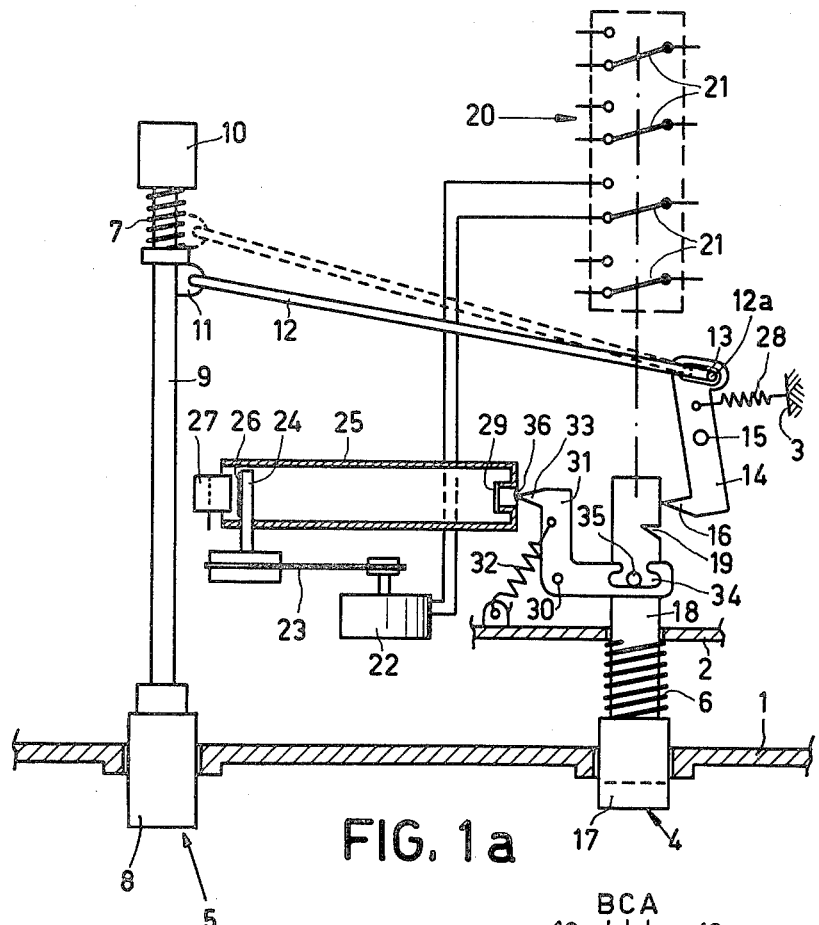
FIG. 1a schematic view of part of a magnetic-tape cassette apparatus in accordance with the invention in a first embodiment, employing purely mechanical switching means.
Figure 1B:
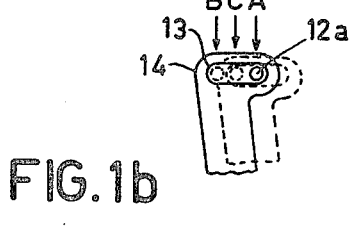

FIG. 1a schematically represents a number of parts of a magnetic tape cassette apparatus in accordance with the invention which are relevant to the present invention. The other parts of the apparatus are not shown for the sake of clarity. The apparatus is of the type as is, for example, described in the Netherlands patent application No. 8,006,257, to which U.S. patent application Ser. No. 317,680 filed Nov. 2, 1981 corresponds. The apparatus comprises a frame 1, which includes the frame sections 2 and 3. The frame 1 also constitutes a front panel of the apparatus, on which a speed selector 4 and a power switch 5 are arranged. Both controls can be actuated by depression in a direction perpendicular to the front panel, pressure springs 6 and 7 being provided for resetting. The power switch 5 comprises a push-button 8 and a rod 9, which connects the button to a mains switch 10. An electrical power supply of the apparatus, not shown, is switched on and off by means of the mains switch. Moreover, said mains switch comprises latching means (not shown) for latching the power switch in the depressed position. Near the mains switch 10 a lug 11 is mounted on the rod 9, to which lug the end of a connecting rod 12 is attached. The end 12a of the connecting rod 12 which is remote from the lug 11 engages a slot 13 in a latch 14. The latch 14 is pivotable about a pivoting spindle 15 and comprises a pawl 16 near the end which is remote from the slot 13. The position of the connecting rod 12, if the mains switch 10 is switched off, is represented by uninterrupted lines in FIG. 1a, whilst the other position in which the main switch 10 is switched off is represented by broken lines. As is shown in FIG. 1b, the end 12a butts against the right-hand end of the slot 13 in a position A when the main switch 10 is set to off. By depressing the push-button 8 the end 12a first moves to the left-hand end of the slot 13 (position B) and then back to position C, in which the switch 10 is latched by the latching means.

The speed selection element 4 comprises a push-button 17 as well as a rod 18. In the rod 18 a recess 19 is formed. The rod 18 is further connected to a switching element 20, which comprises a series of switches 21, which among other things switch an electric motor 22 between two drive speeds. The motor 22 is coupled to a capstan 24 via a belt transmission 23, which capstan engages a magnetic-tape cassette 25 at least during operation of the apparatus. During playback and recording the magnetic tape 26 in the cassette 25 is driven by cooperation of the capstan 24 with a pressure roller 27. Since the speed switching element 20 can be switched between a first and a second position the drive of the capstan 24 can be switched to a first and a second speed respectively. In the apparatus in accordance with the invention a first drive speed is chosen which is the normal speed for compact-cassette equipment and which is 4.76 cm/sec.

Depressing the speed-selection element 4 from the position shown in FIG. 1a results in the switches 21 switching the motor 22 to a second drive speed. In the embodiment shown this second drive speed corresponds to a tape drive speed of the capstan of 2.38 cm/sec. This speed is referred to hereinafter as the long-play speed. When the speed switching element 20 is switched from the first to the second position the electronic recording and playback circuitry of the apparatus is switched over, in addition to the motor, in order to adapt said circuitry to the second speed of the magnetic tape. The switching element 20 is retained in said second position in that under the influence of a tension spring 28, which is arranged between the latch 14 and the frame section 3, the latch 14 engages the recess 19 with the pawl 16. Since the push-button 17 is depressed this is an indication for the user that the apparatus is set to the long-play speed. The movement of the pawl 16 into the recess 19 is not impaired by the rod 12 because of to the presence of the slot 13. By the pivotal movement of the latch 14, as shown in FIG. 1b, from the position represented by an uninterrupted line into the position represented by a broken line the end 12a of the rod 12 is positioned against the left end of the slot hole 13 in position C.

When the push-button 8 is depressed again in order to switch off the mains switch 10 and thereby render the apparatus inoperative, the end 12a of the connecting rod 12 is moved from position C to position B, so that the power switch 5, if the latch 14 engages the recess 19 with the pawl 16, exerts a force on the latch 14. As a result of this force the latch is pivoted about the spindle 15 in an anti-clockwise direction, so that the speed selection element 4 is unlatched. Subsequently, the pressure spring 6 will return the speed selection element with the speed switching element 20, which is rigidly connected thereto, to the first position. The connecting rod 12 and the latch 14 cooperating therewith function as switching means in the manner described, which means each time after the power switch 5 has been switched off, owing to the actuation of the push-button 8 cause the switching element 20 to be switched from the second to the first position. Thus, the user can be ensured that, at least during normal operation, each time after the apparatus has been switched off the switching element 20 is in the first position, so that when the power switch 5 is subsequently switched on the user can be assured that the apparatus is always set to the normal speed. This prevents unnecessary confusion of the user owing to the provision of two tape speeds.

In addition to this switching facility it may sometimes be desirable to provide the apparatus with an automatic change-over of the tape speed. For this purpose the magnetic tape cassette 25 should have a sensing facility which in the present embodiment is formed by an opening or recess 29 which may be closed or not and which is preferably located in the rear wall of the compact cassette. This opening can be scanned by means of a sensor 31 which pivots about a pivoting spindle 30. A tension spring 32 tends to pivot the sensor 31 in an anti-clockwise direction. The sensor 31 has a sensing portion 33 which, if the opening 29 is free, can engage the opening, whilst the end of the sensor 31 which is remote from the sensing portion 33 is formed with a slot 34 which is open at one side. In the shown position of the rod 18 a pin 35 provided on that rod is situated in the slot 34. Normal compact cassettes, that is cassettes intended for use at the normal tape speed, have a rear wall without the opening 29. Other cassettes may be formed with an opening 29 which is covered by a knock-out 36. The presence of the knock-out 36 or of a closed rear wall ensures that the sensor 31 cannot pivot about the spindle 30, so that the sensor cannot influence the speed selection element 4. Upon depression of the push-button 17 the pin 35 can leave the recess 34 unimpededly owing to the shape of said recess. However, if the recess 29 is not covered and the sensor 31 can consequently pivot, the tension spring 32 can pull the push-button 17 and the rod 18 into the recess 29 against the force of the spring 6, so that the speed switching element 20 is set to the second position and tape transport with the second, long-play, speed is possible. Thus, the sensor 31 can cooperate with the speed switching element 20 and switch the speed element to the second position or, if the element is already in the second position, retain the switching element in this position. Owing to the arrangement of the sensor 31 in the apparatus detection of a free opening 29 prevents the position of the speed switching element 20 from being influenced by the connecting rod 12 when the power switch 5 is actuated. Thus, if a cassette 25 with a free opening 29 is present, the switching element 20 cannot be changed over when the power switch 5 is turned off. In that case the switching element 20 remains in the second position. The sensor 31 with the slot 34 which is open at one side enables the apparatus in accordance with the invention to be controlled in the same way as if no sensor were present when normal compact cassettes are used, because the speed selection element 4 can be switched from the first to the second position unimpededly. If no automatic change-over of the apparatus is desired, the sensor 31 with the associated parts may be omitted.

The purely mechanical construction for changing over the tape speed shown in FIG. 1a is in particular suitable for simple magnetic-tape cassette equipment, such as battery-operated portable equipment. Such a mechanical solution for changing over the tape speed is not suitable for more sophisticated equipment. In that case use can be made of the electromechanical solution represented in FIG. 2. Such a solution has for example the advantage of remote control of the apparatus.

Figure 2:
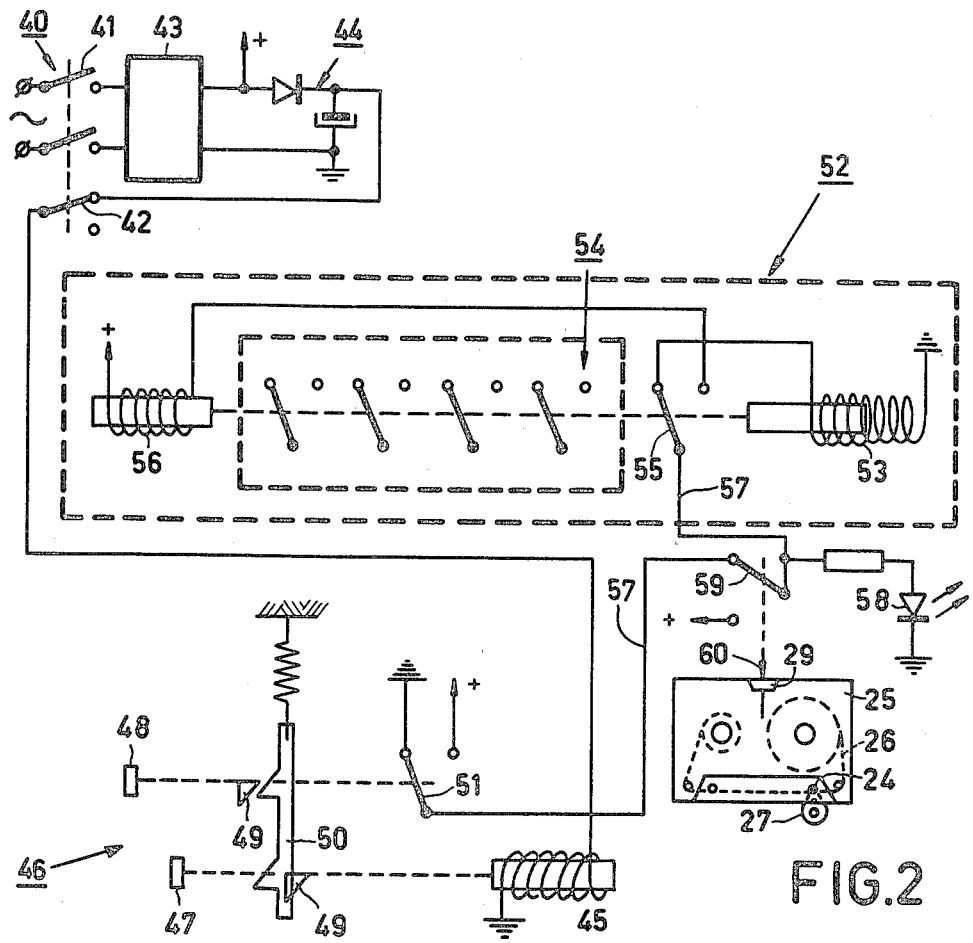
FIG. 2 schematically shows a part of a magnetic-tape cassette apparatus in accordance with the invention in a second embodiment, the switching means being partly mechanical and partly electromagnetic.

The embodiment of a magnetic-tape cassette apparatus in accordance with the invention shown in FIG. 2 comprises a power switch 40, which comprises a mains switch 41 and a switch 42 which is mechanically coupled thereto. The mains switch 41 serves for switching on and off an electrical power supply 43, which provides the necessary supply voltage, such as the + supply. The power supply is followed by a power buffer 44, in which the necessary power for energizing a solenoid 45 can be stored. This energization is effected when the apparatus is switched off by opening the mains switch 41. Opening the mains switch 41 results in the switch 42 between the power buffer 44 and the solenoid 45 being closed. The solenoid 45 is capable of changing over a speed selection element 46, which is mechanically coupled thereto. The speed selection element 46 comprises two push-buttons 47 and 48, which each comprise a rod with a thickened portion 49. The speed selection element 46 is constructed so that a latch 50 each time latches one of the push-buttons 47 and 48 by engagement of the latch 50 with the thickened portion 49, the other push-button being in an unlatched position relative to the latch 50. FIG. 2 shows how the button 47 is latched by the latch 50 in the depressed position. The rod of the button 47 is connected to the solenoid 45, and the rod of the button 48 is connected to an electrical two-position switch 51. Depression of the push-button 47 results in the capstan 24 driving the magnetic tape with the normal speed, while depression of the push-button 48 results in the magnetic tape being driven with the long-play speed in a manner to be described hereinafter.

Upon depression of the button 48 the switching voltage can be applied to a relay 52 via the switch 51. Said relay 52 comprises a solenoid 53, which, when energized can switch a speed switching element 54, which is comparable to the element 20 of the first embodiment, from a first to a second position. Further, the relay 52 comprises a switch 55, which ensures that power is applied from the switch 51 to the solenoid 53 or to a further solenoid 56. As is shown in FIG. 2, the solenoid 53 is constantly connected to earth by one of the connecting wires, and the solenoid 56 is constantly connected to the + terminal by one of the connecting wires. The switch 55 is mounted on a spindle between the solenoids 53 and 56, which spindle changes over the switching element 54. Owing to the construction of the switch 55 the power supply to the solenoids 53 or 56 is interrupted at the appropriate instant depending on the position of the switch 51. Thus, the relevant actuated solenoid 53 or 56 is de-energized immediately after the switching element 54 is switched over. A connection lead 57 between the switched 51 and 55 may include a connection to a light-emitting diode 58, which in the present embodiment is arranged so that when the button 48 is depressed, that is at the long-play speed, the diode lights up to indicate the mode with the long-play speed. Furthermore, the connection lead 57 may include a switch 59, which is mechanically coupled to a sensor 60 for sensing the rear wall of the cassette 25. If the sensor 60 engages an opening 29 of a cassette, the switch 59 connects the relay 52 to the + terminal.

In this embodiment switching means disposed between the power switch 40 and the switching element 54 and comprising the switch 42 and the solenoid 45 also ensure that at least during normal operation, each time after the power switch has been switched off, the switching element is in the first position. This is effected under the influence of the power buffer 44 which is drained via the switch 42, so that the solenoid 45 can be energized. Energization of the solenoid 45 results in the button 48 being unlatched with that button is depressed, so that the speed selection element 46 resumes the first position owing to the force of the springs, not shown, acting on the push-buttons 47 and 48. As a result of this the switch 51 connects the lead 57 to earth, so that the switch 55 connects the lead 57 to the solenoid 56. When the apparatus is again switched on by actuating the mains switch 41 this will directly result in the solenoid 56 resetting the speed switching element from the second position to the first position. The difference with the preceding embodiment is consequently that resetting from the second position to the first position of the speed switching element is not effected until a complete sequence of switching off and again switching on the mains switch 41 has occurred. With this embodiment it is yet ensured that each time that the apparatus is switched on, at least during normal operation, the first tape speed is operative. In this embodiment it is also possible to obtain an automatic switching facility by means of the sensor 60, while in this case, because the sensor 60 does not reset the buttons 47 and 48 in a corresponding manner, it is useful to indicate the relevant automatically selected speed. This is effected by means of the LED 58.

Figure 3:
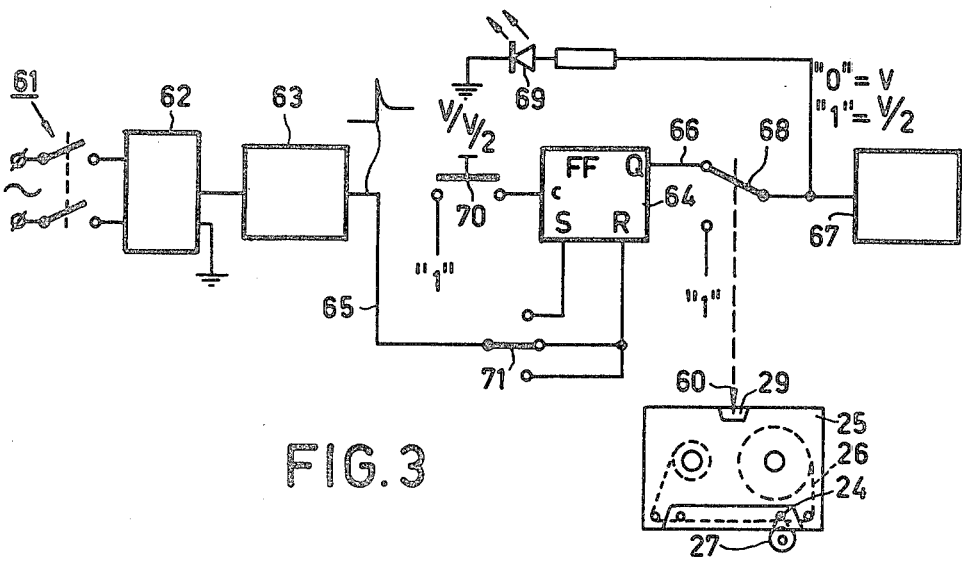
FIG. 3 schematically shows a part of a magnetic-tape cassette apparatus in accordance with the invention in a third embodiment, in which the switching means are purely electronic.

In particular if the magnetic-tape cassette apparatus is controlled by means of a microprocessor it may be desirable to effect such a tape speed change-over in a fully electronic manner. This possibility is represented in FIG. 3. Also in this case there is provided a power switch 61 which switches on and off an electrical power supply 62. The power supply 62 is followed by a pulse shaper 63, which is constituted by an electronic circuit which can generate a pulse immediately after the supply voltage of the apparatus has become available. This pulse is employed to set the electronic bistable circuit to a specific initial state, which circuit performs the function of a temporary memory and is constituted by a flip-flop 64 in the present embodiment. For this purpose a connection lead 65 between the pulse shaper 63 and the flip-flop 64 may be connected to R-input of the flip-flop. Via a connecting lead 66 the Q-output of the flip-flop is connected to a speed switching element 66, which can be switched between a first and a second position and which comprises a plurality of electronic switches which perform the same functions as the switches 21 in the embodiment shown in FIG. 1. In the present embodiment the switching element 67 responds in such a way that a switching voltage "0" corresponds to the normal speed (V) and the switching voltage "1" to the long-play speed (½ V). The connection lead 66 further includes a switch 68 whose function is similar to that of the switch 59 in FIG. 2 and which, if an opening 29 is present in the cassette, can electrically connect the switching element 67 to a switching voltage "1". The switching element 67 responds to a switching voltage "0" by energizing the motor with a voltage necessary to rotate the capstan with the normal speed; the switching voltage "1" corresponds to a speed of rotation of the capstan necessary to drive the tape with the long-play speed. In order to indicate the electrical status of the apparatus to the user there is also provided a light-emitting diode 69. A pulse switch 70 is connected to the C-input of the flip-flop 64, which switch ensures that the flip-flop 64 can change from the one bistable state to the other and vice versa.

The third embodiment also comprises switching means between the power switch 61 and the switching element 67, which means are constituted by the flip-flop 64, and are such that, at least during normal operation, each time after switching off and subsequent switching on of the power switch the switching element 67 is set to the first position by the switching voltage "0" from the Q-output. In this case the speed selection element is constituted by a pulse switch 70 adapted to cooperate with the switching means comprising the flip-flop 64. When a cassette 25 with an opening 29 is sensed in this embodiment the speed switching element 67 can also be changed over owing to the presence of the switch 68 which in this case cannot be influenced by the switching means, constituted by the flip-flop 64, when the power switch 61 is actuated.

In the two first-mentioned embodiments the use of a timer is readily possible. If it is desired to start a recording at long-play speed by means of the timer, the mains switch 41 in the embodiment in accordance with FIG. 2 will not be open, so that the power buffer 64 cannot energize the solenoid 45. As a result of this the apparatus remains set to the long-play speed selected by means of the button 48.

In the embodiment shown in FIG. 3 a preselection switch 71 has been provided for the use of a timer, which switch preferably forms part of the timer. The preselection switch 71 is connected to the lead 65 with one pole and can assume three positions.

A. If no timer setting is needed, the switch connects the lead 65 to the R-input. In this situation the pulse from the pulse shaper 63 ensures that the flip-flop 64 is set to such a state that the required switching voltage "0" is obtained on the Q-output, in order to set the switching element 67 to the normal mode by means of the switches.

B. By means of the preselection switch 71 the pulse shaper circuit 63, depending on the operation of the timer, may be connected to the R-input or the S-input of the flip-flop 64. Connection to the R-input yields exactly the same result as already described for the off-position of the timer switch.

C. When connected to the S-input the pulse generated by the pulse shaper 63 is employed to set the flip-flop 64 to such a state that the Q-output supplies the appropriate switching voltage "1" necessary to set the electronic switching element 67 to the desired long-play mode, when the apparatus is started via the timer.

It is to be noted that if no timer is used the lead 65 may be connected directly to the R-input of the flip-flop 64.

What is claimed is:

1. A magnetic tape cassette apparatus comprising an electrical power supply, a power switch for switching the power supply on and off, a tape drive energized by said power supply, a capstan for the tape drive, and a speed switching element which is switchable between a first and a second position, for switching the capstan drive to a first and a second speed respectively, characterized by comprising switching means arranged between the power switch and the switching element for setting said switching element to the first position in response to said power switch being switched off and then on again, and means for enabling disconnection of the supply of electrical power to said power supply without causing said switching means to set the switching element to the first position.

2. A magnetic-tape cassette apparatus as claimed in claim 1, in which there is provided a speed selection element which is movable between two positions for setting the speed switching element, characterized in that the speed selection element is arranged in such a way in the apparatus that it can cooperate with the switching means.

3. A magnetic-tape cassette apparatus as claimed in claim 2, characterized in that the speed selection element can be latched at least in the second position and, when the speed switching element occupies the second position, switching off the power switch causes the speed selection element to be unlatched owing to the presence of the switching means, so that the speed selection element resumes the first position under the influence of spring force.

4. A magnetic tape cassette apparatus as claimed in claim 3, characterized in that the switching means comprise a connecting rod disposed between the power switch and the speed selection element, and a latch for latching the speed selection element, the connecting rod being connected to the latch with clearance.

5. A magnetic tape cassette apparatus as claimed in claim 4, characterized in that the power switch performs an extra stroke during switching off, which stroke is such that this eliminates the clearance between the connecting rod and the latch, after which the power switch exerts a force on the latch causing the speed selection element to be unlatched.

6. A magnetic-tape cassette apparatus as claimed in claim 3, characterized in that the switching means comprise an electrical switch and a solenoid, which electrical switch is coupled to the power switch and, upon switching off of the power switch, connects an electric power buffer to the solenoid, which solenoid causes the speed selection element to be unlatched.

7. A magnetic-tape cassette apparatus as claimed in claim 1 or 2, characterized in that the switching means comprise an electronic bistable circuit, which when the power switch is switched on is set to such a state that an output of the circuit supplies the switching voltage required to set the switching element to the first position.

8. A magnetic-tape cassette apparatus as claimed in claim 7, characterized in that the bistable circuit is constituted by a flip-flop, whose Q-output and C-input are respectively connected to the speed switching element and to the speed selection element, a pulse-shaping circuit being arranged between an R input and the electrical power supply, at least during normal operation.

9. A magnetic-tape cassette apparatus as claimed in claim 8, characterized in that the R-input or the S-input of the flip-flop is connected to the pulse-shaping circuit by means of a pre-selection switch.

10. A magnetic-tape cassette apparatus as claimed in claim 1, 3, 5, or 6, a sensor being provided for sensing a wall of a magnetic tape cassette, which sensor, at least if a recess is formed in the wall, cooperates with the speed switching element and sets or maintains said element in the second position, characterized in that the sensor is arranged in the apparatus in such a way that when a cassette with a recess is sensed the setting of the speed switching element is not influenced by the switching means upon actuation of the power switch.

11. An apparatus as claimed in claim 1, characterized in that said means for disabling comprises a timer switch.

* * * * *